(12) United States Patent
Nambakkam

(10) Patent No.: US 9,014,197 B2
(45) Date of Patent: Apr. 21, 2015

(54) E911 IMPLEMENTATION FOR IP PHONES

(75) Inventor: Sampath Nambakkam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1427 days.

(21) Appl. No.: 11/486,459

(22) Filed: Jul. 14, 2006

(65) Prior Publication Data

US 2008/0013523 A1  Jan. 17, 2008

(51) Int. Cl.
| | |
|---|---|
| H04L 12/66 | (2006.01) |
| H04L 12/28 | (2006.01) |
| H04M 11/04 | (2006.01) |
| H04M 7/00 | (2006.01) |
| H04L 29/06 | (2006.01) |
| H04M 3/42 | (2006.01) |

(52) U.S. Cl.
CPC ......... *H04M 7/0075* (2013.01); *H04L 65/1073* (2013.01); *H04M 3/42042* (2013.01); *H04M 2242/04* (2013.01); *H04M 2242/22* (2013.01); *H04M 2242/30* (2013.01)

(58) Field of Classification Search
USPC .............................................. 370/352; 379/45
See application file for complete search history.

(56) References Cited

U.S. PATENT DOCUMENTS

| | | | |
|---|---|---|---|
| 6,501,421 B1 * | 12/2002 | Dutta et al. ............... | 342/357.13 |
| 6,687,245 B2 | 2/2004 | Fangman et al. | |
| 6,819,929 B2 * | 11/2004 | Antonucci et al. ............ | 455/445 |
| 7,127,044 B1 * | 10/2006 | Becker et al. .................. | 379/45 |
| 7,130,385 B1 * | 10/2006 | Moon ............................. | 379/45 |
| 7,227,941 B2 * | 6/2007 | Baumeister et al. ..... | 379/218.01 |
| 7,440,442 B2 | 10/2008 | Grabelsky et al. | |
| 7,706,356 B1 | 4/2010 | Olshansky et al. | |
| 7,711,094 B1 | 5/2010 | Olshansky et al. | |
| 2003/0063714 A1 * | 4/2003 | Stumer et al. ................... | 379/37 |
| 2003/0109245 A1 * | 6/2003 | McCalmont et al. ......... | 455/404 |
| 2003/0169751 A1 * | 9/2003 | Pulkka et al. ................ | 370/401 |
| 2003/0225893 A1 | 12/2003 | Roese et al. | |
| 2004/0190497 A1 | 9/2004 | Knox | |
| 2005/0007999 A1 * | 1/2005 | Becker et al. ................. | 370/352 |
| 2005/0083911 A1 * | 4/2005 | Grabelsky et al. ............ | 370/352 |
| 2005/0213716 A1 | 9/2005 | Zhu et al. | |
| 2005/0270560 A1 | 12/2005 | Ferlitsch | |
| 2006/0043164 A1 | 3/2006 | Dowling et al. | |
| 2006/0056388 A1 | 3/2006 | Livingood | |
| 2006/0193447 A1 | 8/2006 | Schwartz | |
| 2006/0274725 A1 | 12/2006 | Freitag et al. | |
| 2007/0104183 A1 | 5/2007 | Bakke et al. | |
| 2007/0115941 A1 * | 5/2007 | Patel et al. ..................... | 370/352 |
| 2008/0133762 A1 | 6/2008 | Edge et al. | |

OTHER PUBLICATIONS

Patel et al. (U.S. Appl. No. 60/729,673 of US 20070115941), filed Oct. 24, 2005.*
"Cisco Emergency Responder Version 1 2(2)." Cisco Systems, Inc. (1992-2004), pp. 1-7.
"Location Services for IP", Nortel (May 9, 2005), pp. 1-40.

* cited by examiner

*Primary Examiner* — Faruk Hamza
*Assistant Examiner* — Thinh Tran (57) ABSTRACT

A system including an application server, the application server communicatively coupled to a service bureau configured to store location information, and communicatively coupled to a communication device over an Internet Protocol (IP) network, the communication device configured to transmit to the application server a call request message in order to establish a voice communication session, and to transmit voice information during the voice communication session; wherein the application server is configured to associate the communication device with a first telephone number and a second number, and the second number is associated with the stored location information.

20 Claims, 8 Drawing Sheets

E911 IMPLEMENTATION FOR IP PHONES

CROSS REFERENCE TO RELATED PATENTS

The present invention relates to the following co-pending commonly owned U.S. patent applications: "Mapping of IP Phones of E911" filed Dec. 28, 2005, Ser. No. 11/318,836; and "E911 Location Server," filed Nov. 16, 2005, Ser. No. 11/274,301.

BACKGROUND INFORMATION

For a Public Switched Telephone Network (PSTN) service, telephone numbers are tied to a physical infrastructure and known physical addresses at a specific geographic location. If a user places a 911 call from a telephone having one of these stationary telephone numbers, the physical address for the telephone can be determined by querying an Automatic Location Identification (ALI) database.

For Internet Protocol (IP) phones, the above scenario is not possible because the IP phones can be easily moved from one physical location to another. IP phones can re-register for service wherever the IP phone can establish an IP connection. In addition, IP phones can be located as "softphones"—software-implemented phones—on IP-capable mobile devices, such as laptops and handheld devices.

Another problem is an IP phone can be assigned a traditional telephone number (e.g., NPA-XXX-XXXX) that is normally associated with a totally different number plan area (area code) and prefix from its actual physical location. The IP phone having a corresponding telephone number may not have a relationship to its corresponding number plan area and prefix for its home location even for an IP phone physically at its home location.

Yet another problem is that several different IP phones, each of which are located at different physical locations, can be registered to the same traditional telephone number. This would be a generalization of the concept of phone extensions, except that for Voice over Internet Protocol (VoIP, also known as Internet Telephony), the extensions can be geographically dispersed and nomadic. Therefore, it is difficult to determine the location of each of the IP phones.

DESCRIPTION OF THE PREFERRED EMBODIMENTS

Reference will now be made in detail to the exemplary preferred embodiments implemented according to the invention, the examples of which are illustrated in the accompanying drawings. Wherever possible, the same reference numbers will be used throughout the drawings to refer to the same or like parts.

Figure 1:
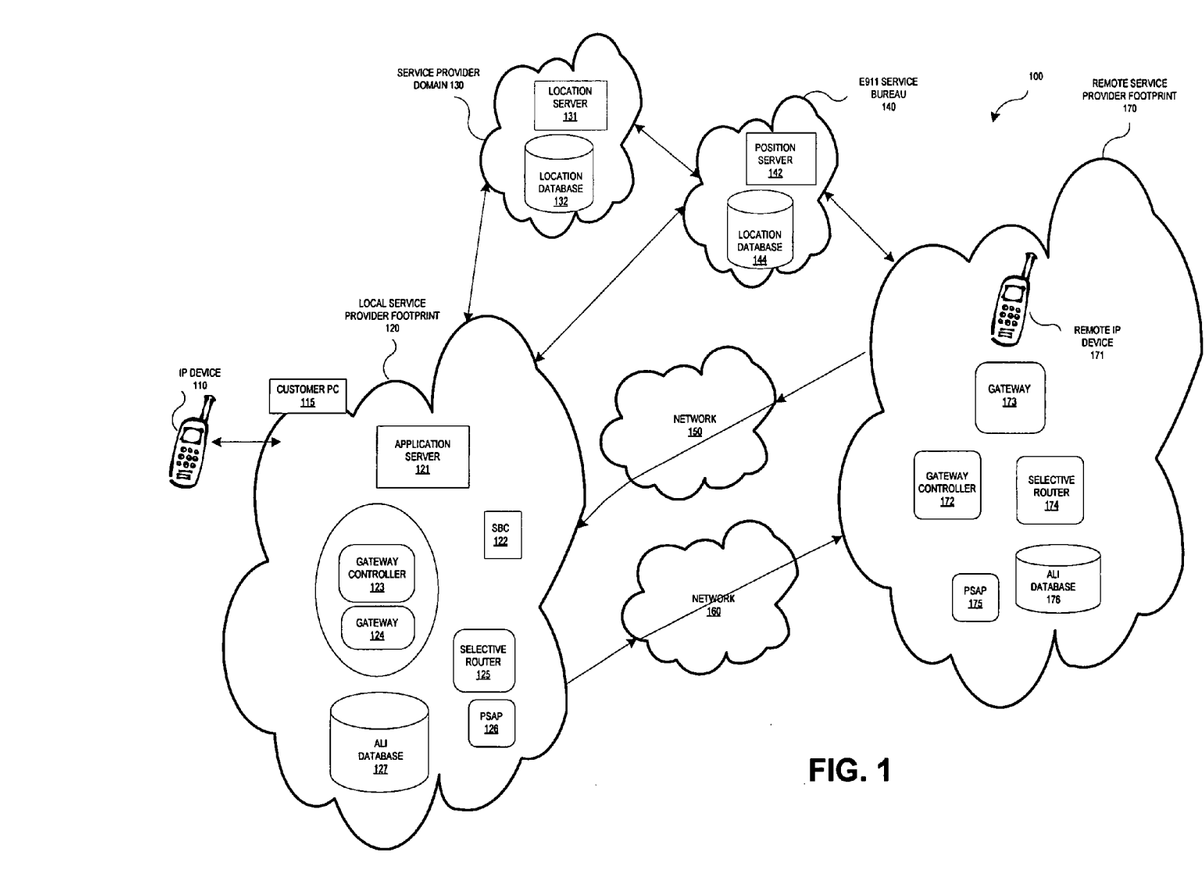
FIG. 1 is a block diagram of an exemplary emergency call network.

FIG. 1 is a block diagram of an exemplary emergency call network. The exemplary emergency call network 100 can be any type of system that transmits information over a network. For example, emergency call network 100 can be a VoIP system that communicates using data packets that are transmitted over the Internet or some other Internet Protocol (IP) capable network. Emergency call network 100 includes a user communication device 110, a personal computer (PC) 115, local service provider footprint 120, a service provider domain 130, a Service Bureau 140, various networks 150, 160, and a remote service provider footprint 170.

Communication device 110 is a device that allows a user to speak to other remote users. In some embodiments, device 110 can be an IP phone, a softphone, or any device that allows users to make a telephone call using IP transmissions (an "IP device"). In some embodiments, IP device 110 may also be a telephone based on a wireless system, for example, an IP cellular telephone, a cellular telephone, or a telephone based on a satellite system. IP device 110 may be a conventional smart phone, such as a PC phone, a Session Initiation Protocol (SIP) phone, and a phone based on the call control standard commonly referred to as H323, which can process signals based on voice and/or Dual Tone Modulation Frequency (DTMF) tones. In some embodiments, IP device 110 may also include a Wireless Access Protocol (WAP) client, such as a cellular telephone, a Personal Digital Assistant (PDA), and a HyperText Transfer Protocol (HTTP) client, such as an Internet browser, which can process signals based on text. As used herein, IP device includes, but is not limited to, all of the above and is not intended to be restrictive in any way.

As shown in FIG. 1, IP device 110 may be connected to the local service provider footprint 120 via a conventional telephone line, a cable television line, a Digital Subscriber Line (DSL), an Integrated Services Digital Network (ISDN) line, a wireless transmission, and/or another communications line. The IP device 110 may also be connected to the service provider footprint 120 through an intermediary. For example, the IP device 110 may be connected to the service provider footprint 120 via a base station and a switch, such as a base station and a switch for a cellular telephone.

PC 115 can include a processor (CPU) and a memory system including various memories such as RAM, disc drives, etc. Each of the PCs 115 may also include a display or monitor, a keyboard, and possibly one or more additional user input devices (not shown) such as a mouse, joystick or track ball. Typically, the software running on the PC 115 includes an operating system, such as Windows, and a series of compatible application programs running under the operating system. The software preferably implements a graphical user interface, including a user interface for communications to the local service provider footprint 120.

PC 115 can have voice communication capabilities. For example, PC 115 can include a microphone and one or more speakers. PC 115 can also include analog to digital and digital to analog converters, and the CPUs in such PC 115 may run software for compression and decompression of digitized audio (typically voice) information. The software also processes the audio information for transmission and reception of the compressed digital information in IP packets and using the appropriate protocol, for communication with the respective access server.

Local service provider footprint 120 is a communication system. For example, the local service provider footprint 120 can be a wireline or cellular network using IP transport. Local service provider footprint 120 can communicate with a service provider domain 130, a Service Bureau 140, and a remote service provider footprint 170 via network 160. Local service provider footprint 120 may include, among other things, an application server 121, a session border controller (hereinafter "SBC") 122, a gateway controller 123, a gateway 124, a selective router 125, a Public Safety Answering Point (PSAP) 126, and an Automatic Location Information (ALI) database 127.

Application server 121 is a server that includes software and/or hardware that allows it to receive communications or communicate with various other components located in the emergency call network 100. The application server 121 can register the IP device 110 and receive IP call signals from the SBC 122. The application server 121 can communicate with a position server 142 located at the Service Bureau 140. In addition the application server 121 can transmit routing information to the local gateway controller 123 or a remote gateway controller 172 (further discussed below).

SBC 122 is a VoIP session-aware device that controls call admission to the emergency call network 100 at the border of that local service provider footprint 120, and optionally (depending on the device) performs a host of call-control functions to ease the load on the call agents within the network. In some instances, SBC 122 acts as a firewall so that a customer or another server provider cannot determine how a call is routed. In some embodiments, the SBC can hide external and internal IP addresses. In addition, the SBC can filter register messages and forward copies of the register messages to a location server.

Gateway controller 123 is configured to determine the location of IP device 110 and its media capabilities so that a level of service can be chosen that may be possible for all users and operators. In some embodiments, the gateway controller 123 can be a Nortel CS2K Media Gateway controller provided by Nortel Networks. The gateway controller 123 receives routing and query data from the application server 121. Based on the routing data, the gateway controller 123 transmits query data to local gateway 124 or a remote gateway 173 (further discussed below). This communication between the gateway controller 123 and the local or remote gateway 124 or 173 can be conducted using a Media Gateway Control Protocol (MGCP) that handles signaling and session management for a multimedia conference.

Gateway 124 is a device that converts formatted data provided in one type of network to a particular format required for another type of network. Gateway 124, for example, may be a server, a router, a firewall server, a host, or a proxy server. The gateway 124 transforms telephone signaling information and voice data between packet-based (e.g., IP) and telephony protocols and sends the telephone signaling information, and later the voice data, to the selective router 125 over a voice trunk or a VoIP trunk. Gateway 124 may be capable of processing audio, video, and T.120 transmissions alone or in any combination, and is capable of full duplex media translations. Also, gateway 124 has the ability to receive query data signals from the gateway controller 123 to allow the local gateway 124 or the remote gateway 173 to connect to a selective router within the same footprint.

Selective router 125 is a router that provides the routing of a E911 call to the proper PSAP 126 based upon the ESRN (emergency services routing number). The ESRN is a ten-digit number used for routing to the correct Selective Router. The ESRN is determined by the location of the caller as recorded in an ALI database. The ESQK (emergency service query key) is a ten-digit number assigned by the Service Bureau that receives the 911 call. The ESQK enables the PSAP to correlate the call with an entry in the E911 ALI database that contains the location information and the caller's call back number.

In some embodiments, selective router 125 communicates with a selective router database (not shown), which provides the selective router 125 with information for tandem switching of the emergency call and to ensure the routing of an emergency call to the proper PSAP 126 along with an automatic number identification (ANI).

PSAP 126 is an agency responsible for answering emergency calls for emergency assistance from police, fire, and ambulance services. For example, there are roughly 6,500 PSAPs across the United States, where the PSAPs are typically county or city controlled. The PSAP 126 includes an operator console so an operator can determine the location of the emergency caller. PSAP 126 communicates with selective router 125 and the ALI database 127.

ALI database 127 is a database correlating ANI and ALI data with a physical location for each telephone connected to a local or remote network. The PSAP 126 uses the ALI database 127 to automatically display the physical location and telephone number of the IP device 110 being used to make the emergency call. Such information allows the PSAP 126 operator to direct the requested services to the proper location, and allows the PSAP 126 operator to call back in the event the connection is lost, or if more information is needed. If the ALI database 127 does not have the necessary information, the ALI database 127 can communicate with the Service Bureau 140 to get the necessary location and number data.

The service provider domain 130 is a group of computers and devices on a network that are administered as a unit with common rules and procedures and share a common name. The service provider domain 130 includes, among other things, a location server 131 and a location database 132. Location server 131 can receive location information from a PC application or from a web server, wherein the user manually inputs the location information into the PC application or the Web GUI. Location server 131 also provides location information updates to the Service Bureau 140. Location server can also validate addresses against a master address guide such as Master Street Address Guide (MSAG). Location database 132 stores information relating to the location of a user.

Service Bureau 140 provides location and IP device 110 telephone number information to the ALI database 127. The Service Bureau 140 is provisioned with the caller's service address, which may be used as the default static, or home, location as well as routing information to the selective router 125 and PSAP 126. In addition, the Service Bureau 140 provides ESQK information to the local service provider footprint 120 to track the position of a user at an IP device 110. Service Bureau 140, can be, for example, the Intrado Service Bureau. The Service Bureau 140 can include a Service Bureau position server 142 and a Service Bureau location database 144

Service Bureau position server 142 determines location information based on the IP device's 110 telephone number. Service Bureau position server 142, for example, can be an Intrado Position Server. Service Bureau position server 142 utilizes the IP device 110 (or 171, as discussed below) to determine the correct PSAP 126 (or 175) closest to the emergency site and returns the ESRN and the ESQK to the local service provider footprint 120.

Service Bureau location database 144 is a database that stores location and number information of the static or nomadic IP devices 110 or 171. The Service Bureau location database 144 can be, for example, an Intrado location database. The Service Bureau location database 144 can communicate with an ALI database at any service provider footprint.

Networks 150 and 160 allow remote footprints to communicate with each other. Networks 150 and 160 can be Internet Protocol Virtual Private Networks (IP-VPN), the Internet, or any other suitable network. In some embodiments, the networks 150 and 160 are private networks constructed across a public network or Internet. If the data is sent through a public network, the data sent across could be encrypted so the entire network is private. Consequently, in some embodiments, footprints may include encryption and decryption facilities so that the data transmitted across networks 150 and 160 remains private outside the footprint and public within the footprint.

Remote service provider footprint 170 is a communication system that can be similar to or different than the local service provider footprint 120. For example, the remote service provider footprint 170 can be a wireline or wireless IP network or any other type of communication system. Remote service provider footprint 170 can include, among other things, an application server (not shown), a SBC (not shown), a gateway controller 172, a gateway 173, a selective router 174, PSAP 175, and an ALI database 176, each of which have similar capabilities as those described above for the local service provider footprint 120.

Figure 2:
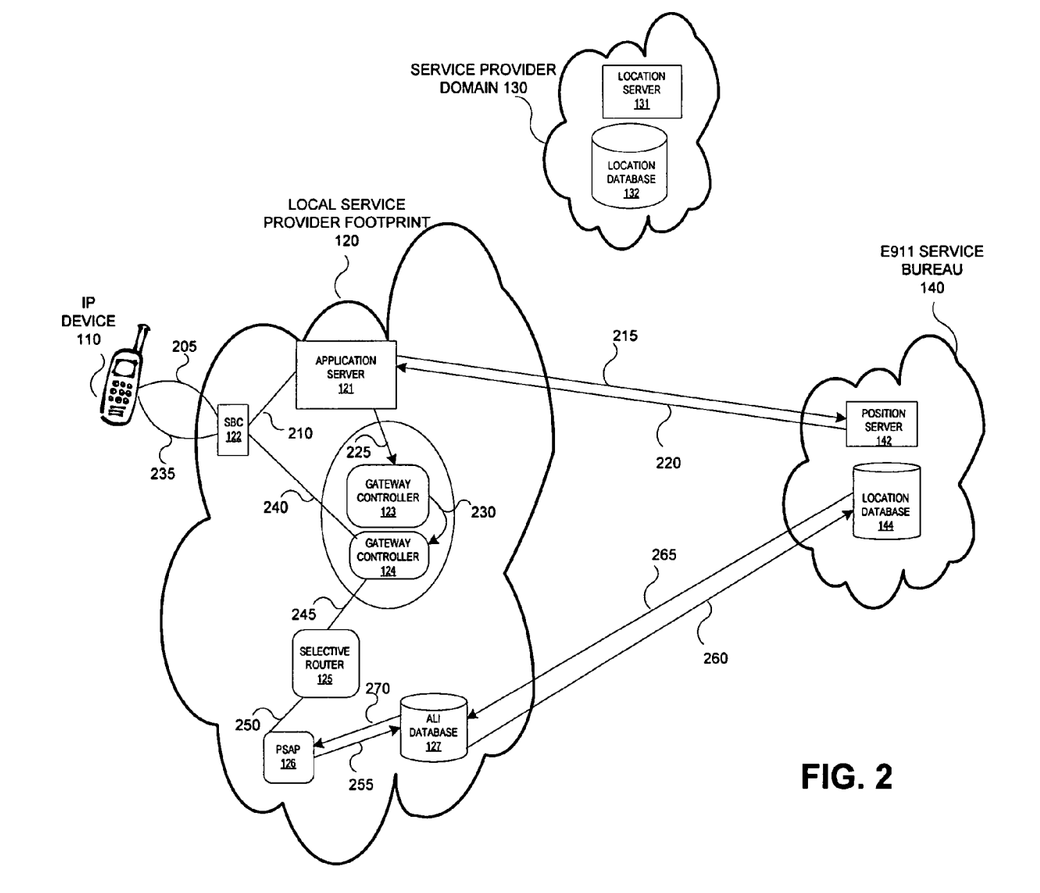
FIG. 2 is a functional diagram showing a first alternative call flow in the exemplary system in FIG. 1 for providing emergency communication for a static emergency caller.

FIG. 2 is a functional diagram showing a first alternative call flow in the exemplary system in FIG. 1 for providing emergency communication for a static VoIP emergency caller using direct trunking. First, the caller dials 911 from the IP device 110 and the IP device 110 transmits (205) the IP call signal to SBC 122. The IP call signal can include a telephone number or other identification of the IP device 110. Once the SBC 122 receives the IP call signal, the SBC 122 can perform call-control functions to the IP call signal. Then, the SBC 122 passes (210) the IP call signaling to the application server 121.

After receiving the IP call signaling from the SBC 122, the application server 121 queries (215) the position server 142 at the Service Bureau 140. For example, the querying can be done using an IP based GRIXE interface, communicating the telephone number, or other identification number, of the IP device 110 to the position server 142.

After the Service Bureau 140 has been queried, the position server 142 transmits (220) ESRN and ESQK parameters to the application server 121 at the local service provider footprint 120. The ESRN can facilitate routing to the appropriate selective router and the ESQK can facilitate routing to the correct PSAP. Also, the ESQK enables the PSAP to correlate the call with an entry in the E911 ALI database that contains the location information and the caller's call back number.

After the application server 121 receives the ESRN and the ESQK, the application server 121 signals (225) to the gateway controller 123 to connect to gateway 124, which in turn connects with selective router 125. This allows the application server 121 to route the emergency call to the appropriate gateway controller 123 and gateway 124. The application server 121 can then remove the "911" and populate the called party number with 10 digit ESRN, which the gateway controller 123 can recognize as an emergency call destined to a specific selective router 125. In turn, the gateway controller 123 removes this 10 digit number, populates the called party number with "911". As a result, the gateway controller 123 connects (230) to the gateway 124 and provides the ESQK to the gateway 124 along with a dedicated (TDM) trunk.

After the gateway controller 123 connects to the gateway 124, the IP device 110 establishes (235) Real Time Protocol (RTP) communications with the SBC 122. As a result, the IP device 110 establishes (240) RTP communications with the gateway 124. Then, the gateway 124 converts the communication from IP to Time Division Multiplexing (TDM). The gateway 124 then passes (245) the direct trunking (TDM trunk) and the ESQK to the selective router 125.

The router 125 connects (250) the call (now TDM-based) to the PSAP 126, located at the local service provider footprint 120, using the E911 trunks that are based on the ESQK values. As a result, the PSAP 126 queries (255) the ALI database 127 to obtain the IP device's 110 ALI and Automatic Number Information (ANI) to be displayed at the operator console of the PSAP 126. If the ALI database 127 has the ALI and the ANI data, the ALI and ANI data is transmitted (270) to the operator console.

However, if the ALI and ANI data are not stored in the ALI database 127, the ALI database 127 performs a steering operation (260), based on the ESQK, to the location database 144 at the Service Bureau 140 to obtain the ALI data and the ANI data. The location database 144 provides (265) the ANI and ALI data to the ALI database 127. As a result, the ALI database 127 forwards (270) the ALI and ANI data to the PSAP 126 where it is displayed at the operator's console. Once the operator has the ALI and ANI data, the operator can determine the location of the user so that, if needed, an emergency help team can assist the user.

Figure 3:
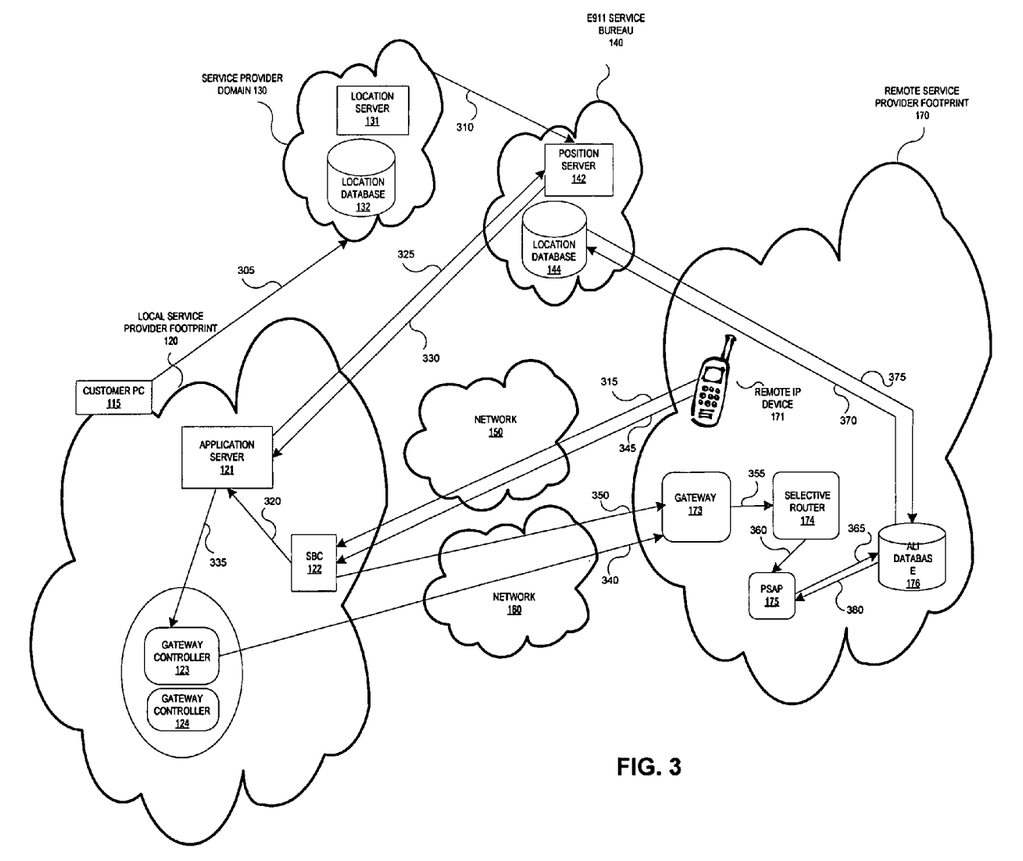
FIG. 3 is a functional diagram showing a second alternative call flow in the exemplary system in FIG. 1 for providing emergency communication for a nomadic emergency caller.

FIG. 3 is a functional diagram showing a second alternative call flow in the exemplary system in FIG. 1 for providing emergency communication for a nomadic emergency caller using direct trunking. First, prior to placing an emergency E911 call, the user updates the (geographic) location of the remote IP device 171. For example, the user may use PC 115 to enter new address information. The PC transmits (305) this location information to the service provider domain 130. The location database 132 stores the location information of the nomadic remote device 171. In addition, the location server 131 at the service provider domain 130 forwards (310) the location information of the IP device to the position server 142 at the Service Bureau 140 to inform Service Bureau of the change of location of the remote IP device 171.

At some time after the Service Bureau 140 has received the remote IP device's location information, the caller dials 911 from the remote IP device 171 and the IP device 171 transmits (315) the IP call signal to the SBC 122 via network 150. Once the SBC 122 receives the IP call signal, the SBC 122 can perform call-control functions to the IP call signal. Then, the SBC 122 passes (320) the IP call signaling to the application server 121.

After receiving the IP call signaling from the SBC 122, the application server 121 queries (325) the position server 142 at the Service Bureau 140. The application server 121 communicates the telephone number or any other identification number of the IP device 171 to the position server 142.

After the Service Bureau 140 has been queried, the position server 142 accesses the location database 144 and, based on the telephone number or other identification of the remote IP device, transmits (330) ESRN and ESQK parameters to the application server 121 at the local service provider footprint 120. The ESRN can facilitate routing to the appropriate selective router, for this example selective router 174, and the ESQK can facilitate routing to the correct PSAP, for this example PSAP 175.

After the application server 121 receives the ESRN and ESQK data, the application server 121 signals (335) to the gateway controller 123 located at the local service provider footprint 120 to connect, via network 160, to gateway 173 located at the remote service provider footprint 170.

The application server 121 can then remove the "911" and populate the called party number with a 10 digit number, which the gateway controller 123 can recognize as an emergency call destined to the selective router 174. In turn the gateway controller 123 removes this 10 digit number and populates the called party number with "911". As a result, the gateway controller 123 connects (340) and provides the ESQK to the gateway 173 located at the remote service provider footprint 170, for example, via network 160.

After the gateway controller 123 connects to the gateway 173, the remote IP device 171 establishes (345) Real Time Protocol (RTP) communications with the SBC 122 at the local service provider footprint 120 via network 150. As a result, the remote IP device 171 establishes (350) RTP communications with the gateway 173 through the SBC 122 via networks 150, 160. Then, gateway 173 converts the communication from IP to Time Division Multiplexing (TDM). The gateway 173 then passes (355) the direct trunking (TDM trunk) and the ESQK to the selective router 174.

The router 174 connects (360) the call (now TDM-based) to the PSAP 175, located at the remote service provider footprint 170, using the E911 trunks that are based on the ESQK values. As a result, the PSAP 175 queries (365) the ALI database 176 to obtain the remote IP device's ALI and ANI data to be displayed at the operator console of the PSAP 175. If the ALI database 176 has the ALI and the ANI data, the ALI and ANI data is transmitted (380) to the operator console at the PSAP 175.

However, if the ALI and ANI data are not stored in the ALI database 176, the ALI database 176 performs a steering operation (370), based on the ESQK, to the location database 144 at the Service Bureau 140 to obtain the ALI data and the ANI data. The location database 144 provides (375) the ANI and ALI data to the ALI database 176 at the remote service provider footprint 170. As a result, the ALI database 127 forwards (380) the ALI and ANI data to the PSAP 175 where it is displayed at the operator's console. The ALI and ANI data allow an operator to determine the location of the user of the remote IP device.

Figure 4:
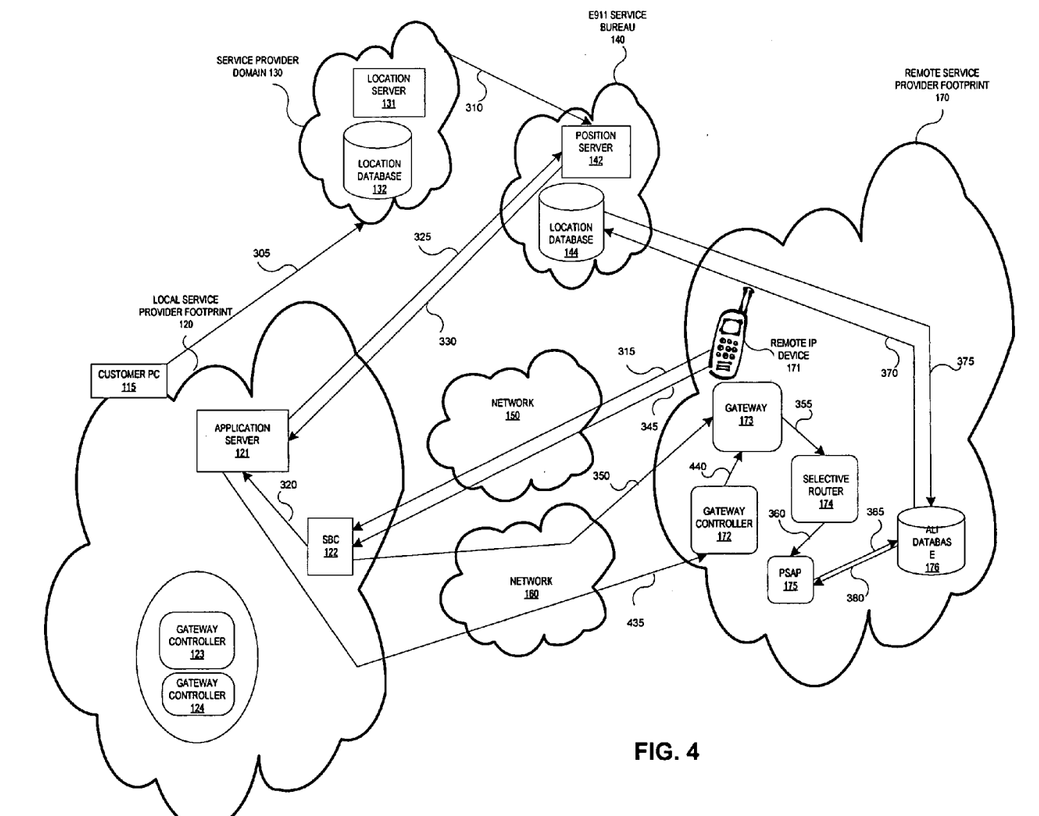
FIG. 4 is a functional diagram showing a third alternative call flow in the exemplary system in FIG. 1 for providing emergency communication for a nomadic emergency caller.

FIG. 4 illustrates an alternate embodiment to that of FIG. 3. The call processing illustrated in FIG. 4 is similar to that of FIG. 3, except that the application server 121 signals (435) to the gateway controller 172 located at the remote service provider footprint 170 (instead of the local gateway controller 123), which accordingly connects with (440) and provides the ESQK to the gateway 173.

Figure 5:
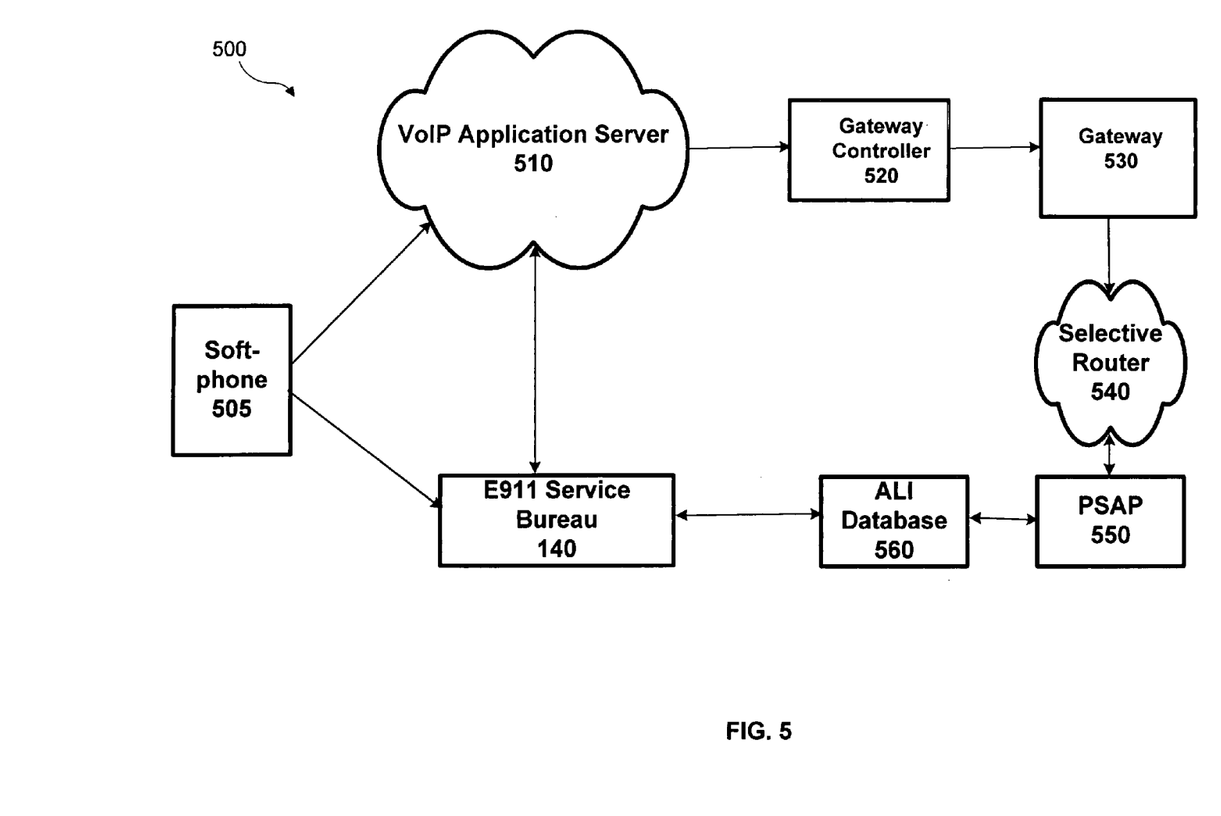
FIG. 5 is a block diagram of an exemplary system for providing emergency communication for a softphone emergency caller.

FIG. 5 is a block diagram of an exemplary system for providing emergency communication for a softphone emergency caller. The exemplary system 500 includes a softphone 505, an application server 510, a Service Bureau 140, gateway controller 520, a gateway 530, a selective router 540, a PSAP 550, and an ALI database 560. The exemplary system 500 can include a business entity that may have several business locations, an extended campus, a neighborhood, or a large building, such as a multi-story office building.

Softphone 505 is a software implemented phone on IP-capable devices, such as PCs, laptops and handheld/mobile devices. As noted above, a softphone is typically a software application that works in association with VoIP technology enabling one to make calls directly from a laptop or PC. Softphones are typically a part of VoIP environments and may be standard-based (e.g., SIP, H.323) or proprietary. In some embodiments, softphone 505 has a keyboard or an interface so that a keyboard can be connected to the softphone 505. In some embodiments, the softphone 505 is used with a headset connected to the IP-capable device.

In some embodiments, softphone 505 has a first telephone number (a primary telephone number) associated with outgoing calls. This primary telephone number may also be associated with other IP telephony devices—for example, in the case where a user would like calls routed to multiple locations, such as an office phone and a mobile phone. In addition, a second number, such as Direct Inward Dialing (DID) number, can be assigned to the softphone 505 for emergency situations. This second number would be unknown to the user. In some embodiments, the second number can be a ten digit number, similar to the primary telephone number. In some embodiments, the second number can be any type of identifier (including alphanumeric characters).

In the example of FIG. 5, IP device 110 of FIG. 1 has a corresponding softphone 505, and both of these devices have a primary telephone number, such as "781-555-1234." After registering, softphone 505 also has a second telephone number, for example "781-555-0000." This second number helps distinguish between the two devices even though they have the same primary telephone number, and, as described further below, can be used for location identification purposes (e.g., for emergency communications).

VoIP Application Server 510 is a network device that includes at least application server 121. In some embodiments, VoIP Application Server includes, among other things, SBC 122.

As stated above, Service Bureau 140 provides location and IP device 110 telephone number information to the ALI database. The Service Bureau 140 is provisioned with the caller's service address, which may be used as the default static, or home location, as well as routing information to the selective router and PSAP. Service Bureau 140 can include a position server 142 and a location database 144, as shown in FIG. 1. Service Bureau 140 can store location information for softphones 505 and for a plurality of IP devices 110, 171. For each entry, Service Bureau 140 can store a primary telephone number, a second (e.g., emergency) number, the type of device (e.g., IP device, softphone), and the address of the IP device. As a result, a user can have separate physical addresses for the IP device 110 and the softphone 505 if the softphone has an emergency number. The IP device's telephone number would be associated with the physical address of IP device 110, while the softphone's emergency number would be associated with the physical address of the softphone 505. Thus, when a user dials "911," emergency personnel can locate the user, whether the user is dialing from IP device 110 or 171 or softphone 505, even when the IP device and the softphone have the same telephone number because, in the case of the softphone, the softphone can use the emergency number for the outbound call. In some embodiments, Service Bureau 140 may store an emergency number for an IP device where the emergency number could be the same as the primary telephone number. In some embodiments, for two or more IP phones or softphones having the same primary telephone number, the Service Bureau 140 may store emergency numbers that are different for each IP phone having the same primary telephone number to distinguish the physical address of each device.

Depending upon the configuration and the location of softphone 505, as shown above in FIGS. 1-4, gateway controller 520 can be either gateway controller 123 of the local footprint 120 or gateway controller 172 of the remote footprint 170; gateway 530 can either be gateway 124 of the local footprint 120 or gateway 173 of the remote footprint 170; selective router 540 can be either selective router 125 of the local footprint 120 or selective router 174 of the remote footprint 170; PSAP 550 can be either PSAP 126 of the local footprint 120 or PSAP 175 of the remote footprint 170; and ALI database 560 can be either ALI database 127 of the local footprint 120 or ALI database 176 of the remote footprint 170. Gateway controller 520, gateway 530, selective router 540, PSAP 550, and ALI database 560 each have similar capabilities as those described above for the local service provider footprint 120

Figure 6:
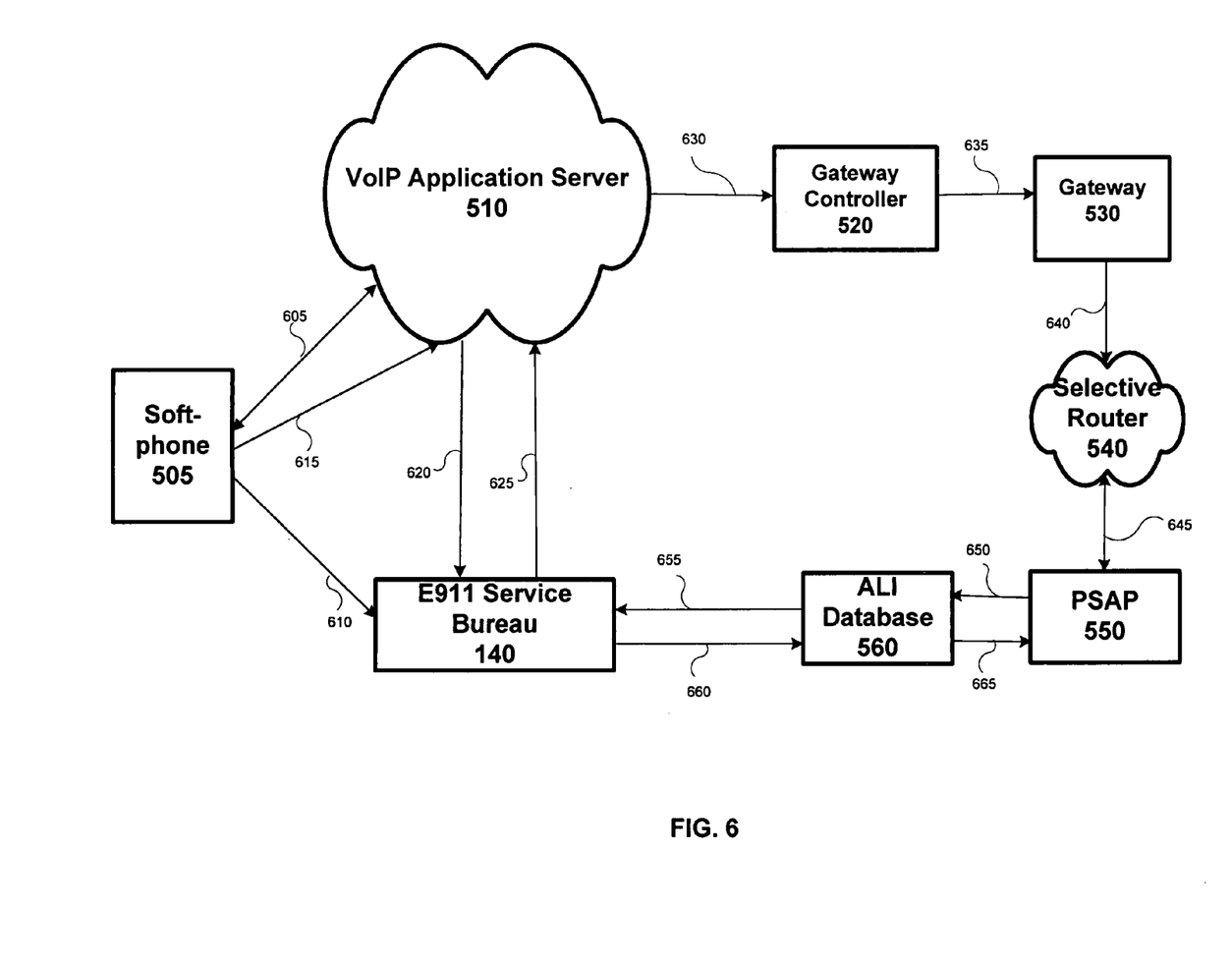
FIG. 6 is a functional diagram illustrating a call flow in the exemplary system in FIG. 5 for providing emergency communication for a softphone emergency caller.

FIG. 6 is a functional diagram illustrating a call flow in the exemplary system in FIG. 5 for providing emergency communication for a softphone emergency caller. In this exemplary embodiment, it is assumed that the softphone 505 has an emergency number, and its respective ALI and ANI data are not initially stored at the selective router 540. In addition, in this exemplary embodiment, it is assumed that the softphone 505 already has an assigned telephone number, an assigned device identity, and an assigned private network address, for example number 781-555-1234, device identity 7815551234.devicename and address 192.168.1.57, by the dynamic host config protocol (DHCP) server. Call processing in this example uses the SIP standard, although other call processing protocols could similarly be used.

First, a user initializes the softphone software on the IP-capable device. When softphone 505 first signs (605) into the VoIP application server 510, the VoIP application server 510 returns the associated second (e.g., emergency) number to the softphone. This emergency number can be used for emergency situations. In some embodiments, softphone 505 could identify the emergency number from the VoIP application server 510 using non-SIP mechanism as part of the softphone initialization or retrieving the user's profile. This emergency number could have been associated by the administrator when provisioning the user's account and softphone.

Before the softphone 505 completes the initialization, the softphone prompts the user to enter new (geographic) address information or select from a provided set of addresses. If the user updates the address, softphone transmits (610) the updated address information to Service Bureau 140. In some embodiments, as shown in FIGS. 3 and 4, this updated address information can be routed to the service provider domain 130 before being transmitted to Service Bureau 140. Once Service Bureau 140 receives the updated address information, the address could be validated against a standard address database, such as Master Street Address Guide (MSAG). Once validated, the updated address, corresponding to the emergency number, can be stored in the Service Bureau 140.

After a successful address update in the Service Bureau 140 or pending success in cases where asynchronous mechanisms are needed to be used to update the Service Bureau, the softphone initiates a registration request to the VoIP application server 510 (for example, by sending a SIP REGISTER message). In some embodiments, the registration is conducted using both the primary telephone number and the emergency number. Registration and/or future communications may be secured using a user password, which can be pre-assigned by an administrator and/or retrieved over a secure channel during initialization of the IP-enabled device (for example, as part of a configuration or user profile) using a non-SIP mechanism such as HTTPS.

After initialization, a user can use the softphone 505 for voice communications. For all inbound calls to the primary telephone number, various advanced call control facilities can be used to route call connection requests to both the softphone 505 and the IP device 110 associated with the primary telephone number (sometimes referred to as "shared call appearance"). For outbound calls, the primary telephone number or emergency number may be used to identify the calling party, as further described below.

As noted above, in some embodiments, a second number capability can be employed in both IP device 110 and softphones 505. For example, the second number for the IP device may be set as the same as the primary telephone number, while the second number for the softphone may be set as a different number. In some embodiments, second number capability is only enabled for softphones. In such cases, the VoIP application server could determine whether an incoming communication is from an IP device or softphone and then assign an second number if the incoming initial communication is from a softphone.

Figure 8:
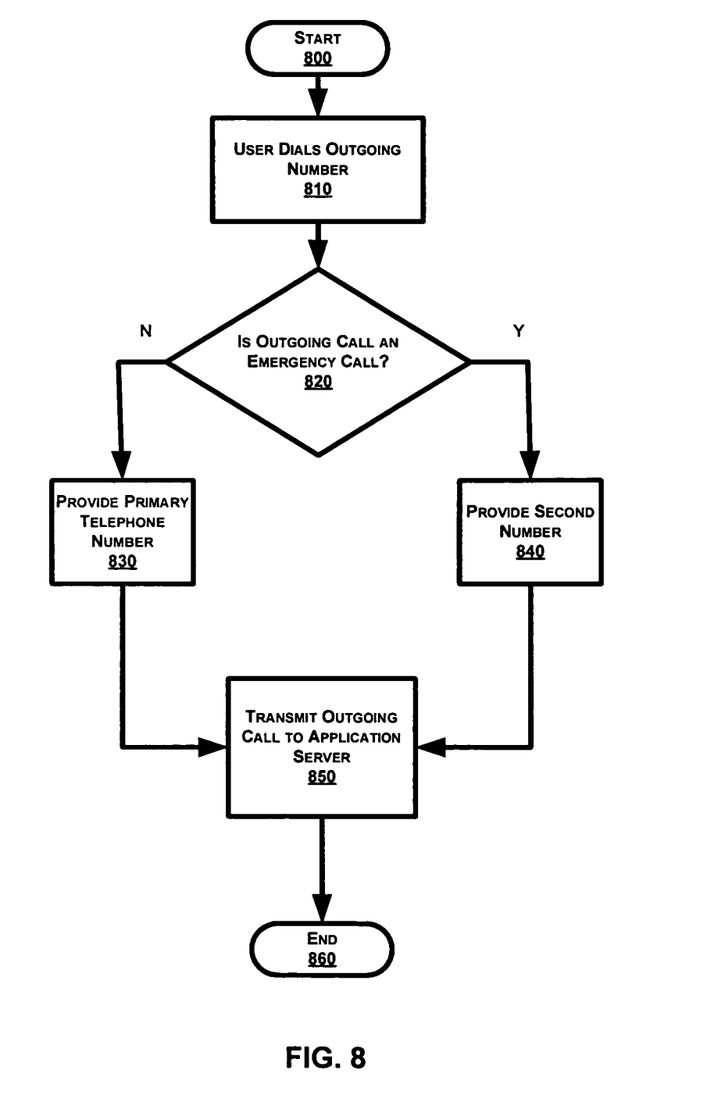
FIG. 8 is a flowchart representing an exemplary method for transmitting an outgoing call and its corresponding number to an application server.

When a call is initiated (615) at the softphone, a call request is sent to the VoIP application server 510. Depending on the embodiment, either the softphone or the VoIP application server can determine whether the call is an emergency call (e.g., it is a "911" call) and what the emergency number is that is associated with the softphone. For example, where the softphone detects that the call is an emergency call, the softphone may automatically, provide the emergency number as the calling party ID to the VoIP application server 510. FIG. 8 illustrates such a process. As shown in FIG. 8, the user dials (810) an outgoing number. The softphone determines (820) whether the outgoing call is an emergency call. If the outgoing call is an emergency call, the calling party number assigned to the outgoing call is the second number (840). Otherwise, the calling party number assigned to the outgoing call is the primary telephone number (830). After determining which number is assigned to the outgoing call, the outgoing call request, along with its corresponding number, is transmitted (850) to the VoIP application server.

Alternatively, in some embodiments, the application server may detect that a call request is an emergency call, in which case, the application server may automatically use the emergency number associated with the softphone even if the outbound call request from the softphone only indicates the primary telephone number as the calling party number. To obtain the correct emergency number, the application server could query the Service Bureau to retrieve the emergency number, for example, based on the type of device, the primary telephone number, type of communication, etc. The application server may also store such information locally for registered devices. In some embodiments, the softphone may also include the emergency number along with the primary telephone number in the call request, in which case the application server may use the emergency number when an emergency call is detected.

Based on the emergency number, VoIP application server 510 queries (620) the Service Bureau 140. In some embodiments, as shown above in FIGS. 3 and 4, the application server 510 could query position server 142 at the Service Bureau 140. The application server 510 communicates the emergency number or any other identification number of the IP device 171 having softphone 505 to the position server 142.

After Service Bureau 140 has been queried, based on the emergency number and its corresponding stored address, Service Bureau 140 transmits (625) ESRN and ESQK parameters to the VoIP application server 510. The ESRN can facilitate routing to the appropriate selective router, for example selective router 530, and the ESQK can facilitate routing to the correct PSAP, for this PSAP 540.

After VoIP application server 510 receives the ESRN and the ESQK, the VoIP application server 510 signals (630) to the gateway controller 520 to connect to gateway 530, which interconnects with selective router 540. This allows the VoIP application server 510 to route the emergency call to the appropriate gateway controller 520 and gateway 530. VoIP application server 510 can then remove the "911" and populate the called party number with 10 digit ESRN, which the gateway controller 520 can recognize as an emergency call destined to a specific selective router 540. In turn, the gateway controller 520 removes this 10 digit emergency number, populates the called party number with "911". As a result, the gateway controller 520 connects (635) to the gateway 530 and provides the ESQK to the gateway 530 along with a dedicated (TDM) trunk. This allows the softphone to establish communications with gateway 530. Then, the gateway 530 converts the communication from IP to Time Division Multiplexing (TDM). The gateway 530 then passes (640) the direct trunking (TDM trunk) and the ESQK to the selective router 540.

Selective router 540 connects (645) the call (now TDM-based) to the PSAP 550 using the E911 trunks that are based on the ESQK values. As a result, the PSAP 550 queries (650) the ALI database 560 to obtain the softphone's 505 ALI and Automatic Number Information (ANI) to be displayed at the operator console of the PSAP 550. If the ALI database 560 has the ALI and the ANI data, the ALI and ANI data is transmitted (665) to the operator console.

However, if the ALI and ANI data are not stored in the ALI database 560, the ALI database 560 performs a steering operation (655), based on the ESQK, to the Service Bureau 140 to obtain the ALI data and the ANI data. Service Bureau provides (660) the ANI and ALI data to the ALI database 560. As a result, the ALI database 560 forwards (665) the ALI and ANI data to the PSAP 550 where it is displayed at the operator's console. Once the operator has the ALI and ANI data, the operator can determine the location of the user so that, if needed, an emergency help team can assist the user.

In addition, the exemplary method described in FIG. 6 can also be used for non-emergency purposes so that an operator/administrator can distinguish the location information of the IP device 110 or 171 and the softphone 505. For example, a delivery-type restaurant may prefer to use the above method to have a more automated system where the restaurant employee can determine the location of the caller based on the IP device that the caller is using. Accordingly, in some embodiments, a softphone and/or VoIP application server can determine whether an outgoing call is a first type of outgoing call or a second type of outgoing call. The first type of outgoing call being a call where an operator/administrator would need to determine the location of the IP device, for example, the emergency call. The second type of outgoing call being a call where the person receiving the call does not need to determine the location of the IP device, for example, where a person is calling a friend to socialize.

Figure 7:
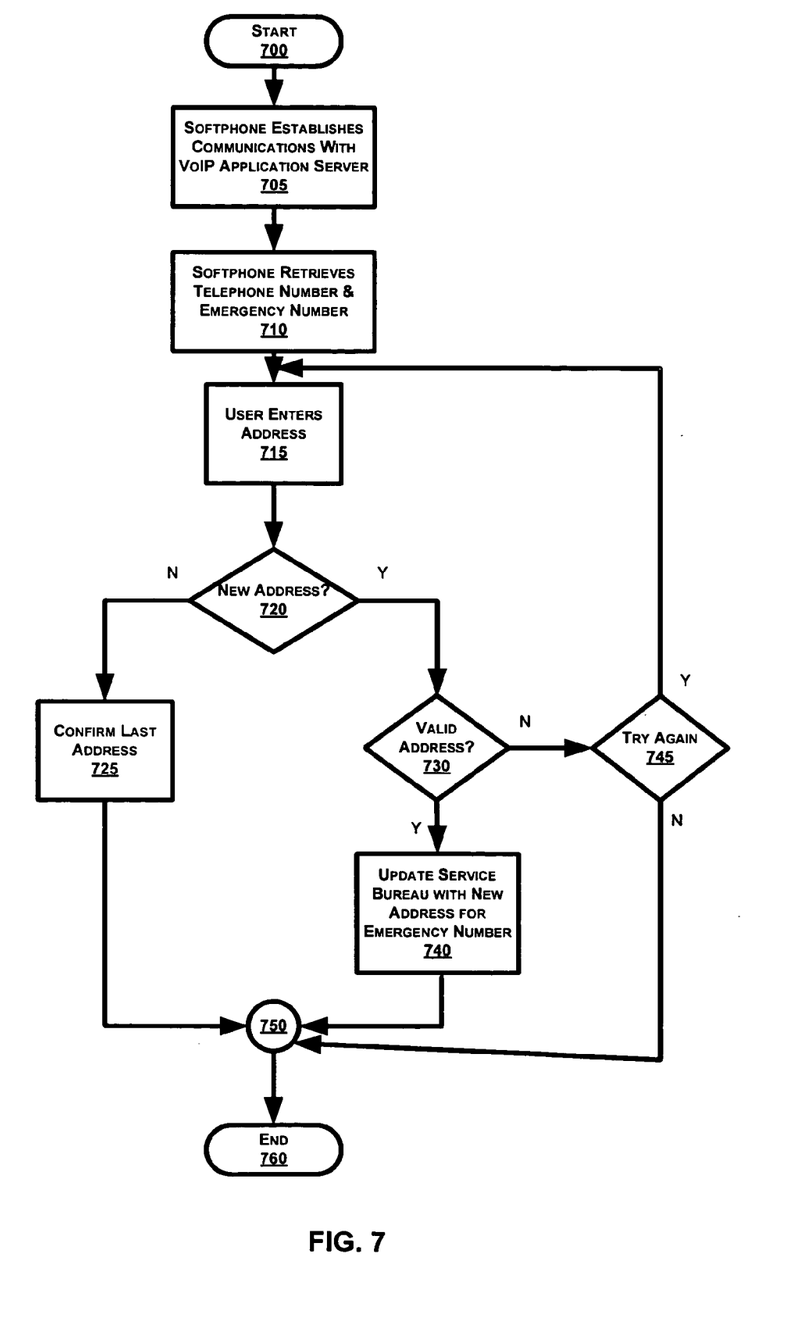
FIG. 7 is a flowchart representing an exemplary method for updating an address of the softphone.

FIG. 7 is a flowchart representing an exemplary method for updating an address of the softphone. It is assumed that an IP device or softphone has established a physical (geographic) address with Service Bureau.

After the initial start step, the user signs into the softphone and the softphone establishes (705) communications with an VoIP application server. Once the communication has been established, the softphone establishes (710) a primary telephone number and a second (e.g., emergency) number with the application server. In some embodiments, softphone could receive this emergency number from the application server using a non-SIP mechanism as part of the softphone initialization or the retrieving of the user's profile.

After the softphone has established the telephone number and the emergency number, the softphone prompts the user to enter (715) either a new address or select from a predefined set of addresses. In some embodiments, the initial address could be the office's address. The softphone software then determines (720) if a new address was entered by the user. If the address is not a new address, the softphone can confirm (725) the entered address. The method can proceed to connector 750 and then end (760).

On the other hand, if the softphone determines that a new address has been entered or selects an address which is different from the one currently stored in an Service Bureau, then the updated address can be validated (730) by a standard address database, such as MSAG. If the standard address database determines that the new address is valid, the Service Bureau is updated (740) to include the updated address corresponding to the emergency number. In some embodiments, after a successful update in the Service Bureau database or pending success in cases where asynchronous mechanism need to be used to update the Service Bureau, the softphone could perform a SIP registration with both the primary telephone number, which is shared with an IP device, and the emergency number, which is private to the softphone. The method can proceed to connector 750 and then end (760).

If the address provided by the user is not a valid address, the method can proceed to determining (745) whether to try again. If so, the softphone can prompt the user to enter either a new address or select from a predefined set of addresses at step 715. Otherwise, if the method determines not to try again, the method can proceed to connector 750 and then end (760)

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention may be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
an application server communicatively coupled to a service bureau configured to store and determine location information based in part on location and number information associated with a communication device previously stored in a location database located within the service bureau, and communicatively coupled to receive from the communication device over an Internet Protocol (IP) network a call request message for establishing a voice communication session,
wherein the application server is located remotely from the service bureau and is configured to:
associate the communication device with a first telephone number and a second number, the first telephone number being associated with the call request message at the time the call is initiated, and the second number being associated with the stored location information;

receive an emergency services routing number (ESRN) and an emergency service query key (ESQK), wherein the ESRN and the ESQK correspond to the stored location information associated with the second number; and transmit the ESRN and the ESQK to a gateway controller, wherein the ESQK is provided from the gateway controller to a gateway associated with the ESRN and is used to establish the voice communication session with a Public Safety Answering Point (PSAP) via a session border control, a gateway, and a selective router associated with the ESRN, wherein a voice communication, provided through the voice communication session, passes through the session border control and is converted from an IP format to a time-division multiplexed format before being received by the selective router.

2. The system of claim 1, wherein the application server is further configured to send a query to the service bureau in response to receiving the call request message, the query including the second number, and to receive from the service bureau the stored location information in response to the query.

3. The system of claim 1, further comprising the gateway controller communicatively coupled to the application server and configured to receive the ESQK and the ESRN from the application server.

4. The system of claim 3, further comprising the gateway communicatively coupled to the gateway controller and configured to receive the ESQK from the gateway controller, receive voice information from the communication device through a session border control, convert the voice information from an IP format to a time-division multiplexed format, and pass the ESQK to the selective router to connect the communication session with the PSAP, wherein the gateway is further configured to connect to the gateway controller after the application server receives the ESRN and ESQK from the service bureau.

5. The system of claim 4, wherein the selective router is communicatively coupled to the gateway and PSAP and configured to route the voice information from the gateway to the PSAP.

6. The system of claim 5, further comprising an Automatic Location Information (ALI) database communicatively coupled to the service bureau and the PSAP and configured to provide ALI to the PSAP in response to a request from the PSAP.

7. The system of claim 1, wherein the communication device is a softphone.

8. The system of claim 1, wherein the second number is an emergency number which corresponds to outgoing emergency calls from the IP device so that emergency personnel can locate a user of the IP device using the stored location information.

9. The system of claim 1, wherein the application server is provided by a local service provider and the service bureau is provided by a second service provider different from the local service provider.

10. The system of claim 1, wherein the second number is a direct inward dialing number assigned to the communication device.

11. The system of claim 1, wherein the first telephone number is associated with a plurality of communication devices at the time the call is initiated.

12. A method comprising:

receiving, by an application server, a call request for establishing a voice communication session from a communication device over an Internet Protocol (IP) network, wherein the communication device is associated with a first telephone number and a second number, and the first telephone number is associated with the call at the time the call is initiated;

querying a service bureau, by the application server, using information of the second number, the service bureau configured to store and determine location information associated with the second number based in part on location and number information associated with the communication device previously stored in a database located within the service bureau; and receiving, at the application server, an emergency services routing number (ESRN) and an emergency service query key (ESQK) from the service bureau in response to the querying, wherein the ESRN and the ESQK correspond to stored location information associated with the second number, and wherein the application server is remote from the service bureau; and transmitting, by the application server, the ESRN and the ESQK to a gateway controller, wherein the ESQK is provided from the gateway controller to a gateway associated with the ESRN and is used to establish a communication session with a Public Safety Answering Point (PSAP) via a session border control, a gateway, and a selective router associated with the ESRN, wherein a voice communication, provided through the voice communication session, passes through the session border control and is converted from an IP format to a time-division multiplexed format before being received by the selective router.

13. The method of claim 12, further comprising establishing a communication with the communication device prior to receiving an emergency call.

14. The method of claim 12, further comprising:
determining whether the call is a first type of outgoing call or a second type of outgoing call; and
selecting either the first telephone number or the second number based on the determination.

15. The method of claim 14, wherein the first type of outgoing call is associated with a determining the physical location of the communication device.

16. The method of claim 14, further comprising transmitting the call request, wherein the call request includes the second number when the call is determined to be the first type of call, and the call request includes the first telephone number when the call is determined to be the second type of outgoing call.

17. The method of claim 12, wherein the communication device is a softphone.

18. A non-transitory computer-readable medium storing instructions executable by a processor, the instructions configured to perform the method of claim 12 when executed by the processor.

19. The method of claim 12, further comprising:
passing the ESQK to the selective router; and
connecting to the PSAP using the ESQK that is passed to the selective router.

20. The method of claim 12, wherein the application server is provided by a local service provider and the service bureau is provided by a second service provider different from the local service provider.

* * * * *